(12) United States Patent
Irwin et al.

(10) Patent No.: US 8,190,747 B2
(45) Date of Patent: May 29, 2012

(54) MOBILE COMMUNICATIONS DEVICE AND ASSOCIATED APPLICATION FOR USE THEREON

(75) Inventors: James Irwin, Newbury (GB); David Pollington, Newbury (GB); David Ashbrook, Newbury (GB)

(73) Assignee: Vodafone Group Services Limited, Newbury, Berkshire (GB)

( * ) Notice: Subject to any disclaimer, the term of this patent is extended or adjusted under 35 U.S.C. 154(b) by 450 days.

(21) Appl. No.: 12/221,917

(22) Filed: Aug. 7, 2008

(65) Prior Publication Data
US 2009/0210537 A1 Aug. 20, 2009

(30) Foreign Application Priority Data
Aug. 8, 2007 (GB) .................................. 0715446.1

(51) Int. Cl.
*G06F 15/16* (2006.01)
(52) U.S. Cl. ........................................ 709/227; 709/217
(58) Field of Classification Search .......... 709/200–203, 709/217–227, 228, 229
See application file for complete search history.

(56) References Cited

U.S. PATENT DOCUMENTS

| | | | |
|---|---|---|---|
| 7,778,792 B2 * | 8/2010 | Huang et al. .................. | 702/141 |
| 2005/0227717 A1 | 10/2005 | Cantini et al. | |
| 2007/0101291 A1 | 5/2007 | Forstall et al. | |
| 2008/0168368 A1 * | 7/2008 | Louch et al. ................... | 715/764 |
| 2008/0168379 A1 * | 7/2008 | Forstall et al. ................ | 715/778 |
| 2008/0168383 A1 * | 7/2008 | Tallapaneni et al. .......... | 715/781 |
| 2008/0228777 A1 * | 9/2008 | Sawant ........................... | 707/10 |
| 2009/0313587 A1 * | 12/2009 | Goodwin ....................... | 715/863 |
| 2010/0138295 A1 * | 6/2010 | Caron et al. ............... | 705/14.49 |

FOREIGN PATENT DOCUMENTS

| | | |
|---|---|---|
| EP | 1 187 022 A2 | 3/2002 |
| WO | WO 2005/015854 A1 | 2/2005 |

OTHER PUBLICATIONS

Fox et al., "Testing for and responding to network connections in the .NET compact framework", available from http://msdn.microsoft.com/en-us/library/aa446548.aspx, accessed by EPO on Oct. 17, 2011, document dated Jun. 2004, 13 pages.

Marcus Perryman, "Connection Manager", available from http://blogs.msdn.com/b/marcpe/archive/2007/07/05/connection-manager.aspx, accessed by EPO on Oct. 17, 2011, document dated Jul. 5, 2007, 7 p.

* cited by examiner

*Primary Examiner* — Moustafa M Meky
(74) *Attorney, Agent, or Firm* — Muirhead and Saturnelli, LLC

(57) ABSTRACT

An application manager configured for use on a resource-limited device, the application manager including: an application engine configured to effect communications between a plurality of applications installed on the resource limited device and one or more external network sites; and a connection manager configured to control and/or coordinate when the plurality of applications are able to attempt to establish communications with the one or more external network sites. The resource-limited device may be a mobile terminal.

25 Claims, 2 Drawing Sheets

MOBILE COMMUNICATIONS DEVICE AND ASSOCIATED APPLICATION FOR USE THEREON

TECHNICAL FIELD

The system described herein relates to a device with computing capabilities, particularly a resource constrained device and a technique for conserving resources associated with the device, such as battery capacity, memory capacity and/or network resources. More particularly, the system described herein relates to a mobile terminal.

BACKGROUND

Mobile terminals, such as mobile telephones, Personal Digital Assistants (PDAs) and the like have an ever-increasing number of functionalities. Where once a mobile terminal was just for transmitting and receiving communications between two entities, now such terminals have innumerable additional functionalities, which are enabled by so-called "Widgets".

In a computing context, a Widget is a single function application that performs a specific task or function. A Widget could also be described as an executable file or applet. Most typically Widgets download data from an external network source, and use that data to display information to the user. The displayed information may invite the user to act in a number of ways. For instance, the user may use graphical components, such as buttons, dialog boxes, pop-up windows, pull-down menus, icons, scroll bars, resizable window edges, progress indicators, selection boxes, windows, tear-off menus, menu bars, toggle switches and/or forms to interact with the Widget.

It is to be appreciated that the term "Widget" can also be used to refer to the graphic component rather than its controlling application or to the combination of both.

Many, but not all, Widgets leverage web technologies to perform a specific task or function and typically display something to the user. An example of one such application is a stock-market Widget that displays the share price of certain stocks, typically stocks pre-designated by the user. A further example is a Widget that is configured to display weather details for one or more pre-designated locations.

Today, mobile terminals typically have multiple Widgets installed, any or all of which can be implemented at any one time. While this provides the mobile terminal with enhanced utility, regular and/or concurrent use of many of the Widgets unfortunately leads to a greater drain on battery resources. The lifetime of a mobile terminal's battery is an extremely important aspect, as users find it undesirable to have to be recharging their terminal's battery with any great regularity, or even worse, having the terminal shut down unexpectedly due to a lack of battery power.

Further, where the Widget is implemented on a mobile terminal, since a cellular network is involved, a Packet Data Protocol (PDP) context additionally needs to be created, in order to send and receive packet switched data via the General Packet Radio Services (GPRS) Core Network. Therefore, before the Widget Engine 11 transmits the data request to the Internet address, via the cellular network, a PDP context needs to be set up. The PDP context is a data structure typically stored on both the Serving GPRS Support Node (SGSN) and the Gateway GPRS Support Node (GGSN) associated the Radio Network Controller (RNC) serving the terminal in the cellular network. The PDP context contains the terminal's active session information. For instance, when a mobile terminal wants to use GPRS, it must first attach and then activate a PDP context. This allocates a PDP context data structure in the SGSN that the subscriber is currently visiting and the GGSN serving the terminal's access point. The PDP context is essentially used by the cellular network to know where to route data intended for the mobile terminal.

In order to send and receive packet switched data the Widget Engine would invoke an HTTP-related API which in turn would trigger the afore-mentioned PDP context set-up. The API would convey the request to the web address 13 via the HTTP Stack 12, which conforms the request according to the Protocol requirements, so that it can be transmitted across the Internet.

Ideally the PDP context is dismantled once the required data has been transmitted. However, it is to be appreciated that in establishing and dismantling the PDP context, more data is required to be transmitted than would be used to transmit the actual content to the terminal. This approach is therefore wasteful and not ideal.

This problem is heightened when multiple widgets are operating at any one time, since the PDP contexts may need to be regularly established and dismantled, using up a lot of network resources.

This problem could be addressed by not dismantling the PDP contexts, and relying on the network to "time out" each PDP context after a particular period of inactivity. This solution is not ideal, however, since the MSC/SGSN can only support a particular number of PDP contexts simultaneously and this approach provides no guarantees that a MSC/SGSN will not be supporting PDP contexts of terminals no longer requiring internet access.

In this regard, it should also be noted that a cellular network is set up with the expectation that not all terminals will have a PDP context established simultaneously.

SUMMARY OF THE INVENTION

According to a first aspect, the system described herein provides an application manager configured for use on a resource-limited device, the application manager including: an application engine configured to effect communications between a plurality of applications installed on the resource limited device and one or more external network sites; and a connection manager configured to control and/or coordinate when the plurality of applications are able to attempt to establish communications with the one or more external network sites.

In some embodiments, the resource-limited device may be a mobile terminal.

According to a second aspect, the system described herein provides, on a resource-limited device having an application engine configured to effect communications between a plurality of applications installed thereon and one or more external network sites, a method of managing the plurality of applications, the method including: coordinating when the plurality of applications are able to attempt to establish communications with the one or more external network sites.

These aspects of the system described herein are concerned with conserving network resources and also conserving battery life and memory capacity. Obviously the latter issues may be particularly applicable to mobile devices. The former issue may be particularly applicable to cellular networks.

DETAILED DESCRIPTION OF EMBODIMENTS OF THE INVENTION

Figure 1:
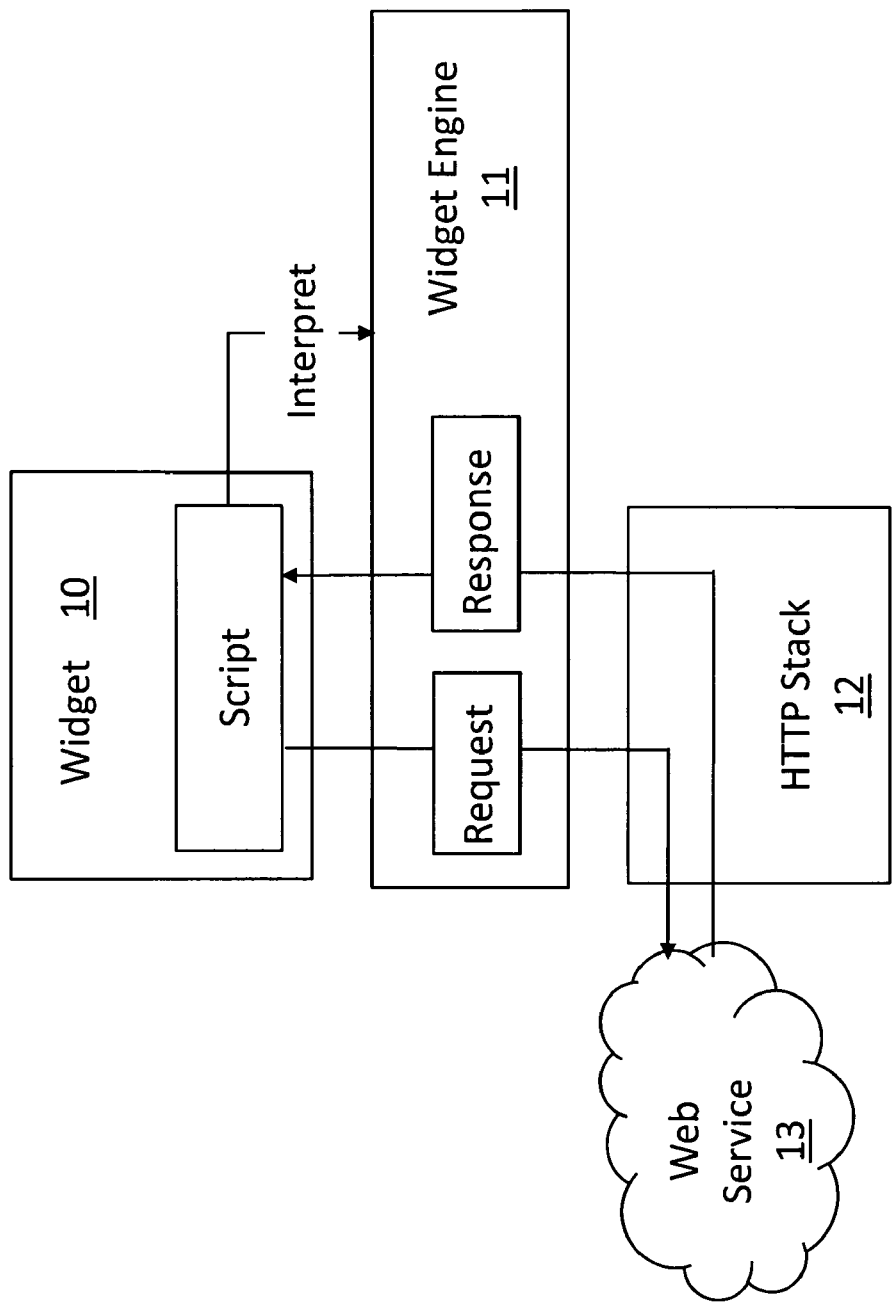
FIG. 1 illustrates a simplified architecture of an example widget framework on a mobile terminal according to the prior art.

With reference to FIG. 1, a simplified architecture of a widget framework, as it currently exists on Mobile Terminals, is shown. Each Widget 10, or application, is in communication with a Widget Engine 11. For simplicity, only one Widget 10 is shown in FIG. 1, but the Widget Engine 11 may be configured to manage multiple Widgets.

In order to minimise their complexity, each Widget may be created using a Scripting language. When a Widget is implemented, the Widget Engine 11 functionally interprets the script. The script may include a request for information from a web service 13.

In other words, the Widget Engine 11 provides a runtime environment for the independent execution of each of the Widgets. In some embodiments, the Widget Engine 11 uses a Javascript runtime environment combined with an XML interpreter, however other platforms are possible. Javascript and XML may be used as they are open standards and therefore usable in many different operating systems, computer architectures and web browsers.

Several Widget Engine platforms have been developed specifically for small resource-constrained devices, for instance, Asynchronous Javascript XML (AJAX) based mobile Widget Engines and Java 2 Platform Micro Edition (J2ME) based mobile Widget Engines.

In addition to script interpretation, the Widget Engine may provide each Widget with lifetime management, and Application Programming Interfaces (APIs) such as presentation APIs and HTTP-related APIs. Presentation APIs take advantage of today's advanced graphics, and allow Widgets to blend fluidly into the Graphical User Interface (GUI) of the terminal without the constraints of traditional window borders. HTTP-related APIs, such as XML Interpreters, may provide access to the internet and web services, via an interface to the HTTP stack. It is to be appreciated that the Hypertext Transfer Protocol (HTTP) is may be used to convey information about the worldwide web, but other protocols could be used. Similarly, information may be conveyed in Hypertext Mark-up Language (HTML) or Extended Hypertext Mark-up Language (XHTML or XML) files, although again, other formats could be used.

Widget 10 is configured such that it seeks access to the web service 13 intermittently, for example once every two hours. The Widget Engine 11 may, upon receiving the access request, interpret the script and seek access the pre-determined network address 13 from which to extract the required information. A PDP context would also be created for the terminal.

As indicated previously, the framework of FIG. 1 is able to support multiple Widgets running concurrently on the terminal, with each Widget being able to connect to the associated Web services, via the Widget engine. However, since the network connections establish and dismantle the PDP context on an independent basis, the usage of network resources may be sub-optimal. Furthermore, as indicated previously, it also places an increased load on the battery leading to a reduction in battery life for the device.

Figure 2:
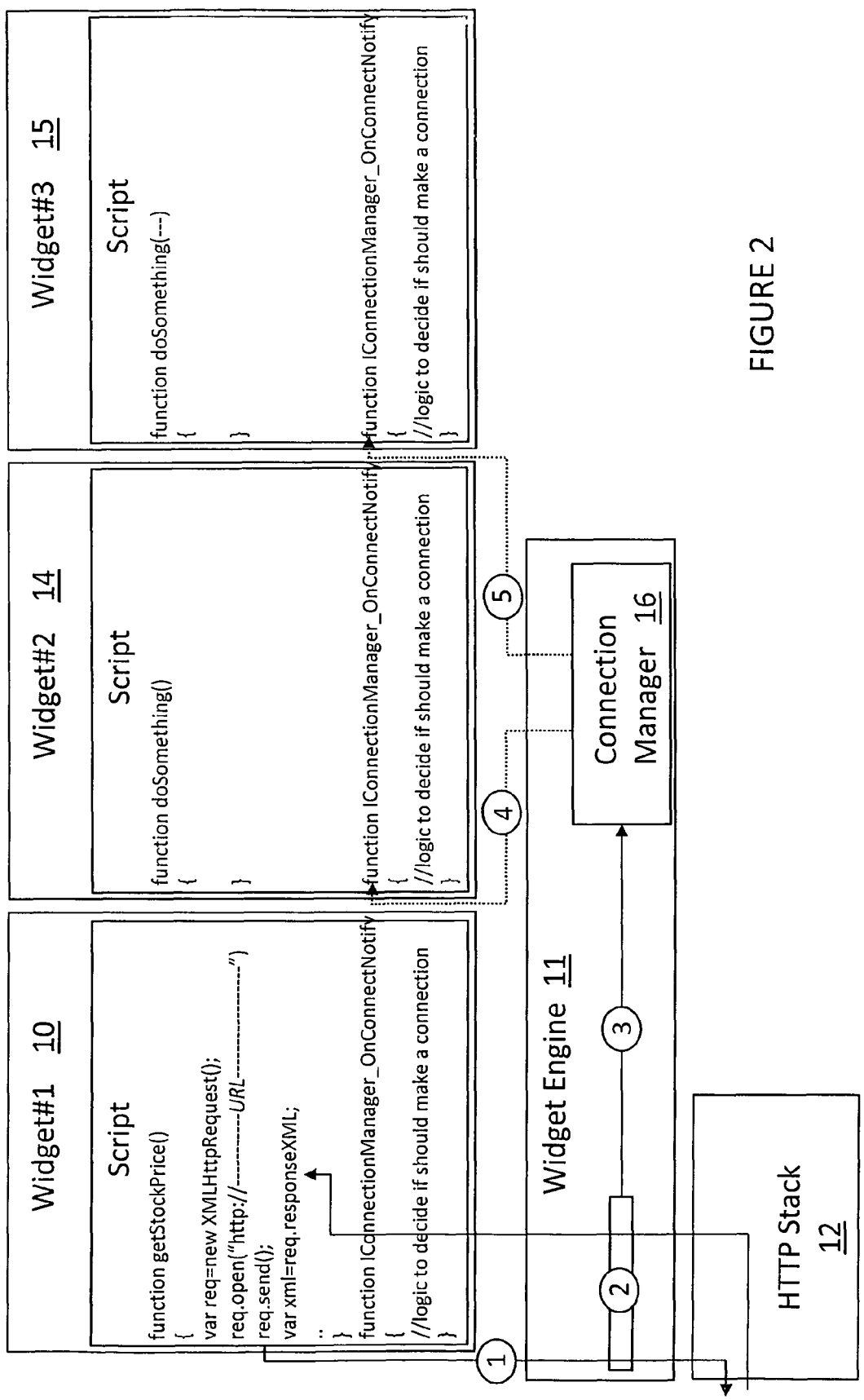
FIG. 2 illustrates a simplified architecture of a widget framework on a mobile terminal according to an embodiment of the system described herein.

To address these issues, the system described herein proposes a connection manager 16 as shown in the FIG. 2 embodiment. The connection manager 16 may be considered as a component of the Widget Engine 11 or as a stand-alone feature.

The connection manager 16 provides a means of coordinating of the Widgets on a mobile terminal. For example, the connection manager may schedule the connection of multiple Widgets to the network at a particular time, in order to reduce the use of network resources and to minimise terminal battery usage. For instance, the connection manager may be configured to make an announcement to all the Widgets when a PDP context has been created, and a network connection has been made. The Widgets may then individually decide whether to access the network at that particular point in time. For some Widgets, access to the network at that time may not be required and may therefore not react to the notification. For example, the Widget may be a television guide that only requires updating every seven days or so.

The Connection Manager can coordinate the Widgets in a number of ways. For example, the connection manager may schedule a connection at a specific time of the day, and make this connection available to each of the Widgets, or can react to a specific request from a Widget and notify the others that it has now opened a connection, which they could also exploit or a combination of both may be employed. The frequency at which a Widget needs to connect is dependent on the type of information being retrieved and presented by the Widget. For example, a Weather Widget may be set with a frequency of 'once per day' whilst a stock Widget may be configured to fire 'after 15 mins'.

In order to allow the Connection Manager to communicate with the individual Widgets, an interface may be defined therebetween. Each Widget is configured to support the interface, so that they can communicate with the connection manager.

In general, the interface may be of an abstract type and may specify a set of behaviours (or methods) that a Widget supporting the interface implements. The interface may be implemented in any appropriate programming language, such as Java or C#. Javascript may be used.

Since all Widgets support the interface, the Connection Manager may be able to iteratively call one or more appropriate functions defined by the interface across the set of active widgets. What each Widget does in response to the function(s) being called, however, is Widget-specific and may be defined by the developer of the Widget at design time.

Referring to FIG. 2, three widgets 10, 14, 15 are illustrated as in communication with the Widget Engine 11 and the Connection manager 16. It is appreciated that this number of Widgets is for illustration purposes only, and any number of Widgets may in fact be implemented. Consider the example of Widget#1 (10) being a widget configured to provide stock market results, widget#2 (14) being a widget configured to provide a weather update and widget#3 (15) being a widget configured to perform some other function.

Widget #1 (10) has an internal timer that fires, for example, every 1 hour. This timer calls the function getStockPrice( ). This function sends a request to a specific URL, parses the response and displays the latest share price to the user. When the timer fires, the resultant HTTP request will trigger the setup of a PDP context, thereby enabling the request and response to be sent at least partially over a wireless network.

More specifically, referring to the steps shown in FIG. 2, every time the timer within Widget#1 fires, getStockPrice( ) is called, which creates a request and sends this to the URL specified within the script (step 1). The script interpreter within the Widget Engine 11 determines that a widget is attempting to access the Internet (step 2), and the script interpreter signals this to the Connection Manager (step 3). The Connection Manager iterates through the collection of active widgets executing the IConnectionManager_OnConnectNotify function in each Widget (steps 4 and 5). The action that each widget performs when this function is called is dependant on the Widget's script contents, which is specific to each Widget.

Where a notified Widget determines that the current point in time is suitable to upload data from its pre-designated URL, it proceeds with sending the request to the URL, without the terminal additionally requiring to set up the PDP context, since this will have already been set up when the first Widget 10 initiated the network communication.

An advantage of this embodiment of the system described herein is that the use of network resources can be reduced and terminal battery usage minimised through the connection manager controlling the scheduling of Widget connections.

According to a further embodiment of the system described herein, a user-defined Widget connection policy exists, which defines when the terminal is able to connect to the network. To effect this embodiment, the connection manager has the functionality of being able to determine if the user has set a Widget connection policy, defining a specific time or times when each Widget can or cannot connect to the network. This connection policy may be implemented as a behaviour/method that is available to all Widgets via the Widget Engine.

These user-defined times may override any Widget specific timings. In this way, a user of a terminal is able to control network connection times, and thereby conserve battery, memory and network resources as required.

According to a further embodiment, the policy may also allow a user to prohibit Widgets from updating when roaming or when battery levels are particularly low.

According to a still further embodiment of the system described herein, the Connection Manager supports the ability to reject a connection request from a Widget. In order to allow Widget developers to handle this case a custom HTTP 5xx response code, may be used. When the Connection Manager refuses a connection request it will respond to the connection request with this response code; this allows the Widget developer to program an appropriate behaviour for the Widget.

When a connection becomes available again the Connection Manager may use the appropriate interface function to signal this to the Widget.

Although the embodiments of the system described herein are particularly applicable to small resource-constrained devices, such as mobile terminals and PDAs, the system described herein may also be applied to other devices with computing capabilities, such as desktop computers, laptop computers and set-top boxes. Obviously, where such devices do not require part of the information retrieval to take place over a wireless network, the PDP context set up may not apply.

The invention claimed is:

1. An application manager configured for use on a resource-limited device, the application manager comprising:
   an application engine configured to effect communications between a plurality of applications installed on the resource limited device and one or more external network sites; and
   a connection manager configured to control and/or coordinate when the plurality of applications are able to attempt to establish communications with the one or more external network sites, wherein the connection manager schedules at least one particular time for any one or more of the plurality of applications to establish communications with the one or more external network sites, wherein the connection manager notifies the plurality of applications when a network connection has been established, wherein the notifying includes inviting the one or more of the plurality of applications to initiate a communication according to the at least one particular time scheduled for the one or more of the plurality of applications, and wherein the connection manager rejects a request for initiation of the communication from the one or more of the plurality of applications that requests communication outside of the at least one particular time scheduled for the one or more of the plurality of applications.

2. The application manager of claim 1, wherein the connection manager is configured to notify the plurality of applications after receiving a communication request from one of the plurality of applications.

3. The application manager of claim 1, wherein the communication manager is configured to notify the plurality of applications at one or more specific times or during one or more specific time periods.

4. The application manager of claim 1, wherein the communication manager is configured to notify an application whose request is rejected that the request has been rejected.

5. The application manager of claim 1, wherein the connection manager is configured to notify an application whose request is rejected when it is capable of performing the request.

6. The application manager of claim 1 wherein the connection manager is further configured to access a user-defined connection policy, defining when the plurality of applications can and/or cannot establish a connection to the one or more external network sites.

7. The application manager of claim 6 wherein the connection manager is further configured to reject a connection request from an application, if the connection request is made at a point in time forbidden by the connection policy.

8. The application manager of claim 1 wherein the device is a mobile telecommunications device and the application engine is further configured to effect the communication across a cellular network to the one or more external network sites.

9. A mobile terminal including the application manager according to claim 1.

10. An application configured for use on a resource-limited device, the application configured to communicate with an application manager, the application manager comprising:
    an application engine configured to effect communications between a plurality of applications installed on the resource limited device and one or more external network sites; and
    a connection manager configured to control and/or coordinate when the plurality of applications are able to attempt to establish communications with the one or more external network sites, wherein the connection manager schedules at least one particular time for any one or more of the plurality of applications to establish communications with the one or more external network sites, wherein the connection manager notifies the plurality of applications when a network connection has been established, wherein the notifying includes inviting the one or more of the plurality of applications to initiate a communication according to the particular time scheduled for the one or more of the plurality of applications, and wherein the connection manager rejects a request for initiation of the communication from the one or more of the plurality of applications that requests communication outside of the particular time scheduled for the one or more of the plurality of applications.

11. The application of claim 10 configured for use on a mobile telecommunications device.

12. The application of claim 10, wherein the connection manager is further configured to determine whether or not to request information from one or more pre-designated external network sites at the at least one particular time.

13. The application of claim 10 wherein the application is a Widget.

14. On a resource-limited device having an application engine configured to effect communications between a plurality of applications installed thereon and one or more external network sites, a method of managing the plurality of applications, the method comprising:
coordinating when the plurality of applications are able to attempt to establish communications with the one or more external network sites, wherein at least one particular time is scheduled for any one or more of the plurality of applications to establish communications with the one or more external network sites;
notifying the plurality of applications when a network connection has been established, wherein the notifying includes inviting the one or more of the plurality of applications to initiate a communication according to the at least one particular time scheduled for the one or more of the plurality of applications; and
rejecting a request for initiation of the communication from the one or more of the plurality of applications that requests communication outside of the at least one particular time scheduled for the one or more of the plurality of applications.

15. The method of claim 14 further comprising:
determining when the network connection has been established by a particular one of the one or more of the plurality of applications; and
notifying the remainder of the plurality of applications that the connection has been established by the particular one of the plurality of applications, wherein the notifying includes inviting the remainder of the applications to initiate a communication, if required.

16. The method of claim 14, further comprising:
notifying the plurality of applications at one or more specific times or during one or more specific time periods.

17. A method of adapting an application so that the application is configured to communicate with a connection manager of an application manager, the application manager having an application engine configured to effect communications between a plurality of applications installed on the resource limited device and one or more external network sites having the connection manager configured to control and/or coordinate when the plurality of applications are able to attempt to establish communications with the one or more external network sites, the method comprising:
configuring the application to support an interface defined by the connection manager, wherein the connection manager schedules at least one particular time for any one or more of the plurality of applications to establish communications with the one or more external network sites, wherein the connection manager notifies the plurality of applications when a network connection has been established, wherein the notifying includes inviting the one or more of the plurality of applications to initiate a communication according to the at least one particular time scheduled for the one or more of the plurality of applications, and wherein the connection manager rejects a request for initiation of the communication from the one or more of the plurality of applications that request communication outside of the at least one particular time scheduled for the one or more of the plurality of applications.

18. The method of claim 17, wherein the communication manager is configured to notify the plurality of applications at one or more specific times or during one or more specific time periods.

19. The method of claim 17, wherein the connection manager is configured to notify an application whose request is rejected when it is capable of performing the request.

20. The method of claim 17, wherein the connection manager is further configured to access a user-defined connection policy, defining when the plurality of applications can and/or cannot establish a connection to the one or more external network sites.

21. The method of claim 17, wherein the resource limited device is a mobile telecommunications device and the application engine is further configured to effect the communication across a cellular network to the one or more external network sites.

22. The method of claim 17, wherein the application is a Widget.

23. An application manager configured for use on a resource-limited device, the application manager comprising:
an application engine configured to effect communications between a plurality of applications installed on the resource limited device and one or more external network sites; and
a connection manager configured to control when the plurality of applications are able to attempt to establish communications with the one or more external network sites, at least partially via a cellular network, by notifying the plurality of applications when a network connection has been established with the cellular network, wherein the notifying includes inviting each of the plurality of applications to initiate a communication using the established cellular network connection, if initiation of a communication is required.

24. The application manager of claim 23, wherein the connection manager schedules at least one particular time for any one or more of the plurality of applications to establish communications with the one or more external network sites.

25. The application manager of claim 24, wherein the connection manager notifies the plurality of applications when a network connection has been established, wherein the notifying includes inviting the one or more of the plurality of applications to initiate a communication according to the at least one particular time scheduled for the one or more of the plurality of applications, and wherein the connection manager rejects a request for initiation of the communication from the one or more of the plurality of applications that requests communication outside of the at least one particular time scheduled for the one or more of the plurality of applications.

* * * * *